UNITED STATES PATENT OFFICE.

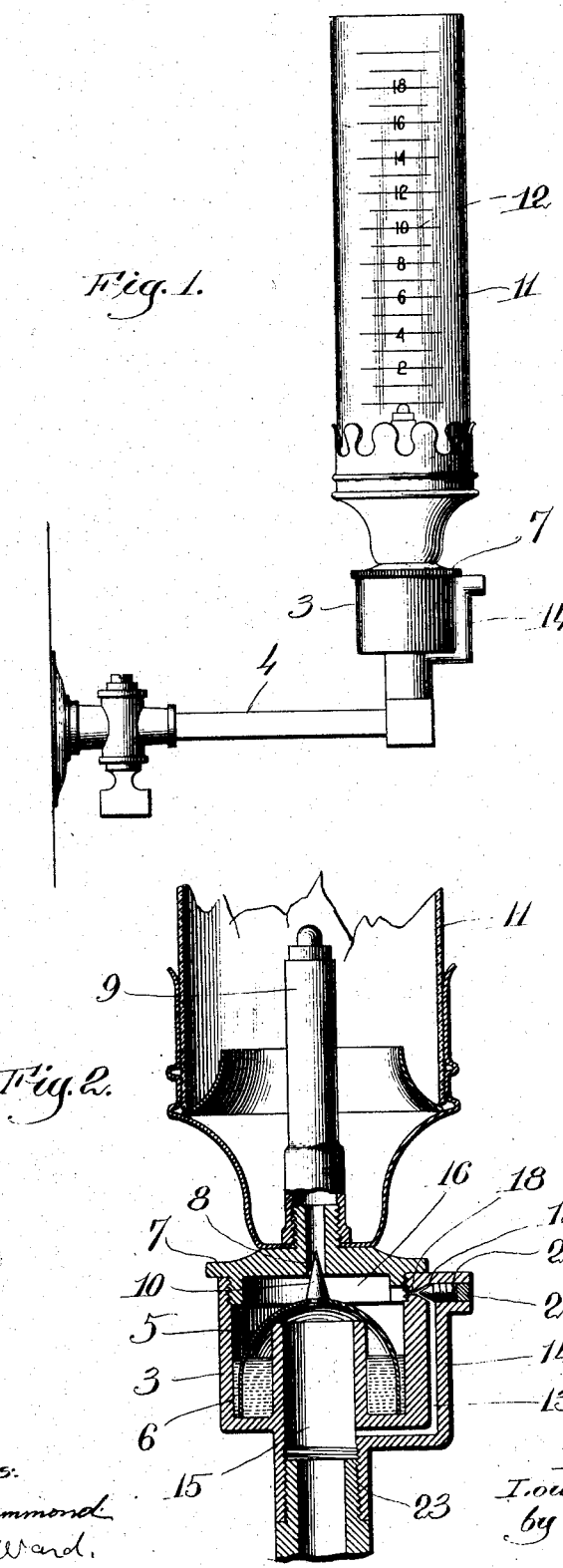

LOUIE E. KNOTT, OF BOSTON, MASSACHUSETTS, ASSIGNOR TO L. E. KNOTT APPARATUS COMPANY, OF BOSTON, MASSACHUSETTS, A CORPORATION OF MASSACHUSETTS.

JET-PHOTOMETER.

No. 907,057.  Specification of Letters Patent.  Patented Dec. 15, 1908.

Application filed July 15, 1907. Serial No. 383,796.

*To all whom it may concern:*

Be it known that I, LOUIE E. KNOTT, a citizen of the United States, residing at Boston, county of Suffolk, and State of Massachusetts, have invented an Improvement in Jet-Photometers, of which the following description, in connection with the accompanying drawing, is a specification, like letters on the drawing representing like parts.

This invention relates to jet photometers such as are used for indicating the candle power of gas.

The object of the invention is to provide an improved device of this class which is so constructed that it can be easily and accurately adjusted in a very short time, and which can be used in measuring or indicating the candle power of different kinds of gas.

Jet photometers as now commonly constructed are rather difficult to adjust, and in their manufacture a great deal of skill and care is required in bringing each individual device to a proper state so that it will correctly indicate candle power of gas. With my improvement, however, this adjustment is a comparatively simple matter and can be accomplished in a few seconds' time.

I will first describe one embodiment of my invention and then point out the novel features thereof in the appended claim.

In the drawings, Figure 1 is a side view in elevation of a jet photometer involving my invention, and Fig. 2 is a vertical central section on an enlarged scale.

The device comprises a base piece 3 which is adapted to be screwed to a gas pipe 4 and which has within it a chamber containing a float 5. This float is bell-shaped, and its lower edges rest in an annular sealing chamber 6 which is partially filled with glycerin or some other liquid thereby forming a liquid seal. Secured to the top of the base is a cap 7 having an aperture 8 therethrough which leads to the jet burner 9 that is supported by the cap in any suitable or usual way. The float 5 is provided with a valve 10 which coöperates with the aperture 8, as plainly seen in Fig. 2.

11 is a chimney supported by the burner on which is indicated a scale 12 designating candle power.

A duct is formed around the float 5 through which duct the gas is admitted to the burner 9, and the accuracy of the instrument depends upon securing the proper size of duct. The float 5 and its valve 10 act as a pressure regulator to maintain a constant pressure at the burner, and the size of the duct controls the amount of gas delivered.

The graduations on the scale 12 have such a relation to the size of the burner and to the amount of gas delivered that the height of the flame as read on said scale indicates the correct candle power of the gas, and for this reason it will be evident that in order that the reading may be correct the size of the duct must be very accurately adjusted. To secure this accurate adjustment of the amount of gas delivered through the duct and provide a construction by means of which such accuracy may be obtained in a minimum time, I provide my device with a duct 13 which connects the chamber 15 that communicates with the gas pipe 4 with the chamber 16 above the float 5 and which duct is formed in the boss 14 formed on the base 3. The boss 14 is formed exterior to the base and at its upper end terminates in a horizontally-extending projection 30. The gas duct 13 terminates at its upper end in a discharge port 18 which is controlled by a needle-valve 19, said needle-valve preferably being screw-threaded into the horizontally-arranged portion 30 of the boss 14 and provided with a notch 21 by means of which it may be turned by a suitable instrument. This needle-valve 19 makes a very simple and yet effective way of adjusting the size of the duct. It is essential that the lower end of the duct 13 enter the chamber 15 at a point above the end of the gas pipe when the base 3 is screw-threaded thereon, and therefore I make said base with the screw-threaded nipple or extension 23 which is screw-threaded on to the gas pipe and so arrange the duct 13 that it enters the chamber 15 above the screw-threaded portion of the nipple 23.

After the device has been made and assembled, as shown, it is essential that it be adjusted before it can be used to register the candle power of gas, and in thus adjusting or setting it, it is screwed on to a gas pipe alongside of a standardized instrument, and after being lighted the needle-valve 19 is adjusted until the flame of the instrument being tested stands at exactly the same height as does the flame of the standardized instrument with which the device is being compared. When this needle-valve is thus adjusted (and the correct adjustment thereof is but the matter of a few seconds) the instrument is properly set and can then be used for determining the candle power of the kind of gas for which it is adjusted. If desired said needle-valve after being set can be sealed by sealing wax or other material with which the end of the hole for receiving the needle-valve may be filled. The presence of the sealing wax is an indication that the device has not been tampered with after it has been sealed.

For measuring candle power of different kinds of gas different chimneys must be used, and the size of the duct 13 has to be differently adjusted. With my improvement the same instrument can be readily converted into one adapted to measure candle power of different kinds of gas by simply shifting the needle-valve 19 as will be obvious. My improved device, therefore, is one which can be readily and accurately adjusted and which can be used for determining the candle power of different kinds of gas.

I have illustrated herein one embodiment only of my invention.

Having fully described my invention, what I claim as new and desire to secure by Letters Patent is:—

In a jet photometer, the combination with a burner, of a base having a gas inlet terminating in a chamber having an open top and surrounded by an annular liquid containing chamber and a gas outlet communicating with said burner, a bell-shaped float inclosing the top of said chamber and having its edges contained in said annular chamber, a valve carried by said float for controlling the gas outlet, said base having exterior thereto a vertically-extending rib 14 in which is formed a gas duct 13, the discharge end of which is arranged horizontally and is provided with a valve seat, and a valve for said seat screw-threaded in the said rib and situated entirely therewithin.

In testimony whereof, I have signed my name to this specification, in the presence of two subscribing witnesses.

LOUIE E. KNOTT.

Witnesses:
THOMAS J. DRUMMOND,
LOUIS C. SMITH.